United States Patent
Honold et al.

(10) Patent No.: US 9,803,318 B2
(45) Date of Patent: Oct. 31, 2017

(54) SPREADER ROLL

(71) Applicant: VOITH PATENT GMBH, Heidenheim (DE)

(72) Inventors: Jochen Honold, Schlingen (DE); Marc Erkelenz, Neu-Ulm (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 15/111,333

(22) PCT Filed: Jan. 9, 2015

(86) PCT No.: PCT/EP2015/050309
§ 371 (c)(1),
(2) Date: Jul. 13, 2016

(87) PCT Pub. No.: WO2015/104362
PCT Pub. Date: Jul. 16, 2015

(65) Prior Publication Data
US 2016/0333522 A1  Nov. 17, 2016

(30) Foreign Application Priority Data

Jan. 13, 2014 (DE) ........................ 10 2014 200 390

(51) Int. Cl.
*D21F 1/40* (2006.01)
*B65H 23/025* (2006.01)
*F16C 13/00* (2006.01)

(52) U.S. Cl.
CPC .......... *D21F 1/40* (2013.01); *B65H 23/0258* (2013.01); *F16C 13/003* (2013.01); *B65H 2404/131* (2013.01); *B65H 2404/136* (2013.01); *B65H 2701/173* (2013.01)

(58) Field of Classification Search
CPC .......... D21F 1/40; B65H 23/025; F16C 13/00
USPC ....................................................... 162/289
See application file for complete search history.

(56) References Cited

U.S. PATENT DOCUMENTS 6,306,069 B1  10/2001  Vesterlund
2006/0183613 A1  8/2006  Niemeyer

FOREIGN PATENT DOCUMENTS

| DE | 20309301 U1 | 8/2003 |
| DE | 69825899 T2 | 1/2005 |
| DE | 60021923 T2 | 5/2006 |
| WO | 9812381 A1 | 3/1998 |
| WO | 2004083661 A1 | 9/2004 |
| WO | 2013167809 A1 | 11/2013 |

*Primary Examiner* — Mark Halpern
(74) *Attorney, Agent, or Firm* — Laurence A. Greenberg; Werner H. Stemer; Ralph E. Locher

(57) ABSTRACT

A spreader roll has a stationary shaft mounted at both ends and running in a curve. A roll shell is supported on the shaft. The construction is simplified in that said roll shell is rotatably mounted, is formed of a flexible material and is supported on the shaft via a lubricating fluid film.

20 Claims, 1 Drawing Sheet

SPREADER ROLL

This application is a 371 of PCT/EP2015/050309 filed on 9 Jan. 2015.

BACKGROUND OF THE INVENTION

Field of the Invention

The invention relates to a spreader roll having a stationary shaft mounted at both ends and running in a curve, and a roll shell supported on the shaft.

Rolls of this type are used in particular in machines for guiding material webs and are intended there to stretch the web in the width in order thus to permit crease-free running.

This is of particular importance in the production and/or finishing of paper, board, tissue or other fibrous webs.

To this end, known spreader rolls often comprise a plurality of rotating segments arranged beside one another on a shaft. Such spreader rolls are described, for example in DE 600 21 923 T2, DE 698 25 899 T2 or else in WO2004/083661. Between these segments there are seals as a safeguard against penetrating moisture. Alternatively, a sleeve, for example of plastic, rubber or material combination, can also be drawn over the segments.

Here, the coupling between the segments is carried out either via this sleeve or via couplings.

This construction is very complicated and susceptible to faults.

BRIEF SUMMARY OF THE INVENTION

The object of the invention is therefore to simplify the construction of spreader rolls and, if possible, to configure the same to be more robust.

According to the invention, the object is achieved in that the roll shell is rotatably mounted, consists of a flexible material and is supported on the shaft via a lubricating fluid film.

This leads to a substantially simpler and therefore also less fault-susceptible configuration of the roll. This is based on the lower number of necessary elements, in particular demanding elements such as bearings, couplings or seals.

Only the roll shell rotates. In order to make this possible with as little friction as possible, the roll shell should be supported on the shaft via the fluid film over a substantial part of its axial extent, preferably over the entire axial extent.

Suitable as a lubricating fluid for this purpose is in particular lubricating oil, preferably a central lubricating oil supply, or else a compressed air pad.

In order that the fluid film can be built up comprehensively, the shaft should have a plurality of fluid feeds into the fluid film that are spaced apart axially from one another. In this way, it is readily possible to ensure a fluid film having a thickness between 0.1 and 5 mm.

In order to minimize the outlay for the fluid supply, the fluid feeds should be supplied with the same lubricating fluid as the bearings of the shaft.

Since the shaft does not rotate, the mounting thereof is also simplified. Nevertheless, this mounting should permit displacement of the position of the shaft and therefore of the curve of the latter in the circumferential direction. This permits improved adaptation of the spreading effect to the specific requirements.

In order to simplify the construction further and to stabilize the fluid film, the bearings of the shaft should have a seal for the lubricating fluid gap between shaft and roll shell.

The rotation of the roll shell can originate from the material web itself or else be produced by a drive via a coupling of the roll shell.

Because of the continuous deformation of the roll shell during the rotation, said shell should consist of a plastic, preferably polyurethane or rubber, and if possible also have reinforcing elements such as fibers, fabrics or the like.

The sliding of the roll shell on the fluid film can be assisted by a smooth inside of the roll shell.

However, it may likewise be advantageous if the inside of the roll shell is designed to be roughened or profiled. In particular, grooves running axially can assist and/or stabilize the buildup of the fluid film as a result of the entrainment of fluid.

The inside of the roll shell can also have other axially pronounced structural elements in preferred embodiments. Thus, structural elements such as grooves or the like do not have to run completely parallel to the shaft. For example, at least one groove which runs helically on the inside of the roll shell can be provided as an axially pronounced structural element. This helical groove can describe one complete revolution or more over the axial extent of the roll shell. However, in further embodiments, it can also describe less than one full revolution. Usually, multiple such structural elements are provided on the inside of the roll shell.

In a particularly advantageous embodiment of the invention, the stationary shaft is made in one piece. A one-piece embodiment is to be understood to mean that the shaft does not comprise a plurality of roll segments arranged over the length of the shaft. The outside of the shaft, on which the roll shell is supported, is continuous over the entire length of the shaft, although openings can be provided, for example for the fluid feeds.

This preferred embodiment is particularly advantageous. The shaft is made of one piece and does not rotate. This simplification of the construction can already reduce the susceptibility to faults considerably. The roll shell is the single rotating part. It runs directly, that is to say lubricated only by the fluid film, on the shaft made in one piece. No further parts such as roll segments, for example, are connected in between. This leads to further simplification of the construction and also further reduces the susceptibility to faults.

Furthermore, provision can be made for the stationary shaft or at least the part on which the roll shell is supported to consist of metal, for example a steel.

The openings of the fluid feeds advantageously have an extent in the circumferential direction of the roll which is smaller than the diameter of the roll.

For example, the fluid feeds can be implemented as drilled holes in the shell, wherein the diameter of the drilled holes is less than 10% of the roll diameter, in particular less than 5% of the roll diameter.

BRIEF DESCRIPTION OF THE SEVERAL VIEWS OF THE DRAWING

The invention is to be explained in more detail below by using an exemplary embodiment. In the appended drawings.

DESCRIPTION OF THE INVENTION

Figure 1:
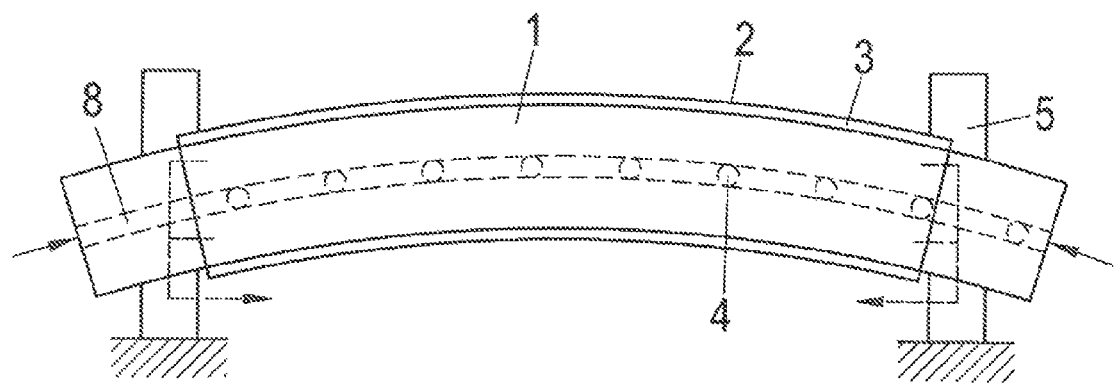
FIG. 1 shows a longitudinal section through a spreader roll.

According to FIG. 1, the spreader roll has a shaft 1 running in a curve and made of steel with a central feed line 8 for lubricating fluid, as a rule oil or compressed air. Here, both ends of the shaft 1 are each held in a stationary bearing 5.

However, the bearings 5 permit displacement of the position of the shaft 1 in the circumferential direction.

Between the bearings 5 there is a roll shell 2, which rotates around the shaft 1 and which is supported on the shaft 1 via a lubricating fluid film 3.

Because of the curved shape of the shaft 1, the roll shell 2 deforms continuously during the rotation. Therefore, the roll shell 2 consists of a flexible plastic, preferably polyurethane or rubber with reinforcing elements 6, here in the form of a fabric.

The roll shell 2 can be set rotating directly via an external drive; however concomitant rotation with the fibrous web as a result of friction is also possible.

In the interests of secure and low-friction guidance of the roll shell 2, the latter is supported on the shaft 1 via the fluid film 3 over its entire axial extent. Here, the radial thickness of the fluid film 3 lies between 0.05 mm and 5 mm, in particular between 0.1 and 5 mm.

In order to ensure this fluid film 3 is as comprehensive as possible, the shaft 1 has multiple fluid feeds 4 spaced apart axially from one another, which are connected to the central feed line 8. At the same time, the supply of the bearings 5 with lubricating fluid is also carried out via the feed line 8.

In order to simplify the structure, the bearings 5 also each have a ceiling unit for the lubricating fluid gap between shaft 1 and roll shell 2. Lubricating fluid can then also be drawn off via this ceiling unit, in order to produce a lubricating fluid circuit.

Figure 2:
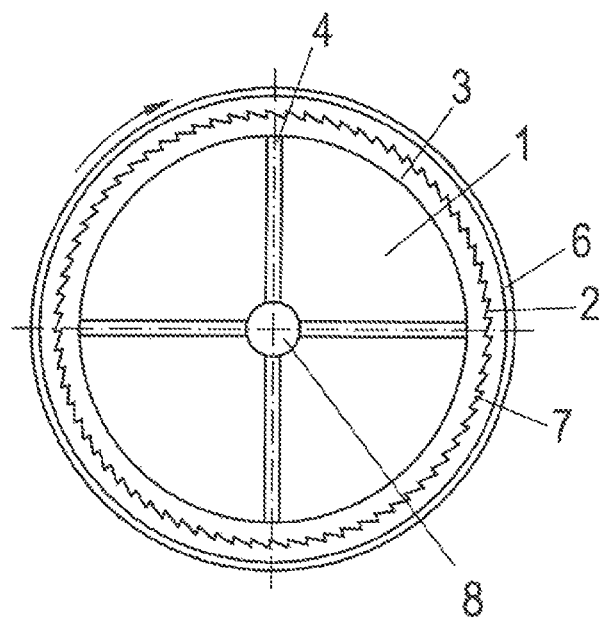
FIG. 2 shows an associated cross section.

As can be seen in FIG. 2, the inside of the roll shell 2 has grooves 7 running axially, the cross section of which resembles a saw-tooth profile. By this means, the transport of lubricating fluid into the load-bearing area can be assisted.

The invention claimed is:

1. A spreader roll, comprising:
a stationary, non-rotatable shaft mounted at both ends and having an arced shape;
a rotatably mounted roll shell supported on said shaft and extending along substantially an entire length of said shaft between the ends thereof, said roll shell being formed of a flexible plastic material and being supported directly on a lubricating fluid film on said shaft.

2. The spreader roll according to claim 1, wherein said roll shell is coupled to a drive.

3. The spreader roll according to claim 1, wherein said roll shell is supported on said shaft via the fluid film over a substantial part of its axial extent, preferably over the entire axial extent.

4. The spreader roll according to claim 1, wherein said shaft is formed with a plurality of fluid feeds for said fluid film, and said fluid feeds are spaced apart axially from one another.

5. The spreader roll according to claim 4, wherein said shaft is supported on a bearing and said fluid feeds are supplied with the same lubricating fluid as the bearing of said shaft.

6. The spreader roll according to claim 1, wherein said fluid film has a thickness between 0.05 mm and 5 mm.

7. The spreader roll according to claim 6, wherein said fluid film has a thickness between 0.1 mm and 5 mm.

8. The spreader roll according to claim 1, wherein said shaft has a position that is displaceable in the circumferential direction.

9. The spreader roll according to claim 1, wherein said shaft is supported on bearings and said bearings include a seal for the lubricating fluid gap between said shaft and said roll shell.

10. The spreader roll according to claim 1, wherein said roll shell consists of a plastic selected from the group consisting of polyurethane and rubber.

11. The spreader roll according to claim 1, wherein said roll shell includes reinforcing elements.

12. The spreader roll according to claim 11, wherein said reinforcing elements are fibers or fabrics.

13. The spreader roll according to claim 1, wherein said roll shell has an inside that is roughened or profiled.

14. The spreader roll according to claim 13, wherein said inside of said roll shell has an axially pronounced structure or axially pronounced structural elements.

15. The spreader roll according to claim 13, wherein said inside of said roll shell is formed with axially extending grooves.

16. The spreader roll according to claim 1, wherein said roll shell has an inside surface that is smooth.

17. The spreader roll according to claim 1, wherein said lubricating fluid is a lubricating oil.

18. The spreader roll according to claim 1, wherein said lubricating fluid is pressurized air.

19. The spreader roll according to claim 1, wherein said stationary shaft is formed of a one-piece structure.

20. A spreader roll, comprising:
a stationary, non-rotatable shaft mounted at both ends and having an arced shape;
a rotatably mounted roll shell supported on said shaft, said roll shell being formed of a flexible polyurethane or rubber material;
said shaft and said roll shell being disposed to form an annular gap therebetween;
a lubricating fluid forming a lubricating fluid film in said annular gap and directly supporting said roll shell on said shaft, said fluid film having a thickness between 0.1 mm and 5 mm; and
said shaft having a plurality of fluid feed openings formed therein for feeding the lubricating fluid into said annular gap.

* * * * *